Figure 1:
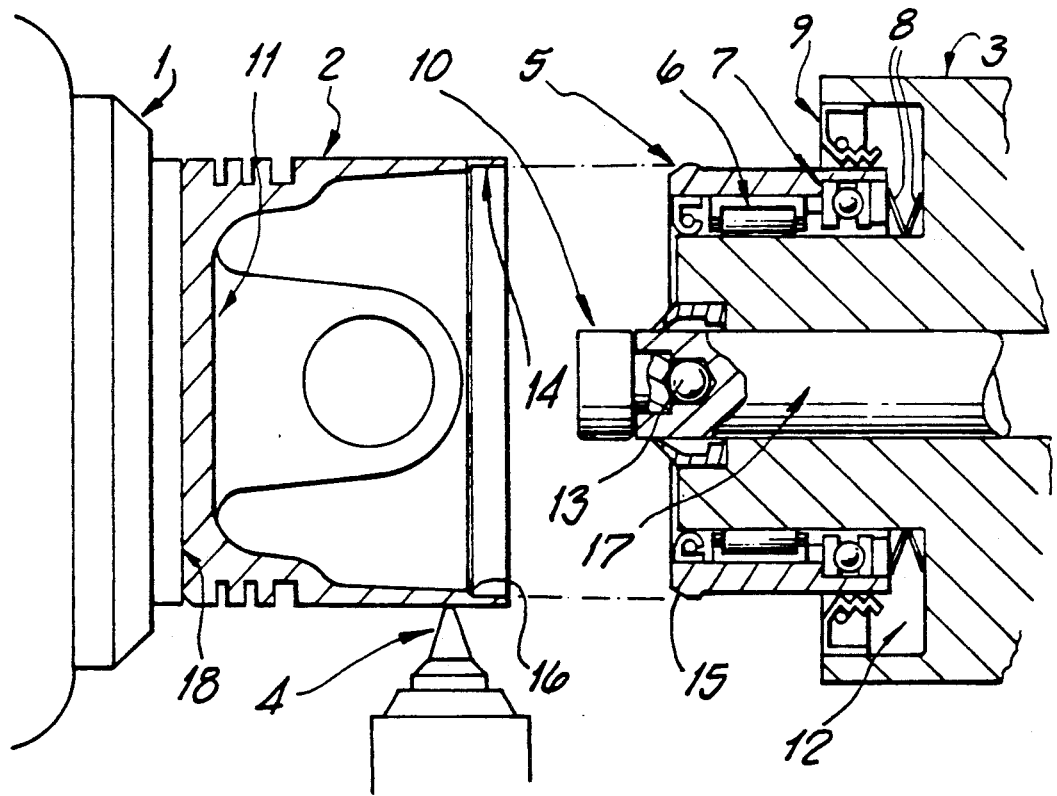

United States Patent [19]

Slee

[11] Patent Number: 5,056,390
[45] Date of Patent: Oct. 15, 1991

[54] WORKPIECE HOLDING DEVICES

[75] Inventor: Roger H. Slee, Warwick, England

[73] Assignee: T&N Technology Limited, England

[21] Appl. No.: 512,420

[22] Filed: Apr. 23, 1990

[30] Foreign Application Priority Data

Apr. 28, 1989 [GB] United Kingdom ................ 8902525

[51] Int. Cl.⁵ ............................................. B23B 33/00
[52] U.S. Cl. .......................................... 82/165; 82/114
[58] Field of Search ................ 82/114, 165, 168, 166;
279/1 L, 32

[56] References Cited

U.S. PATENT DOCUMENTS 2,497,228  2/1950  Miller ..................................... 82/114
2,945,406  7/1960  Moore et al. ......................... 82/114

Primary Examiner—James G. Smith
Assistant Examiner—Lawrence Cruz
Attorney, Agent, or Firm—Nixon & Vanderhye

[57] ABSTRACT

A piston holding device in which a conical register is provided inside the skirt of a piston and is engaged by a conical locating surface on a tailstock. The tailstock may also include a ram which is adapted to push on the inside of a piston crown and force the piston against a headstock. The holding device is used during piston machining.

9 Claims, 1 Drawing Sheet

WORKPIECE HOLDING DEVICES

This invention relates to workpiece holding devices and particularly to such devices for holding pistons for internal combustion engines during machining operations.

It is well known that correct support of the workpiece whilst machining operations are being undertaken is crucially important if high levels of accuracy are to be maintained; this is particularly so in the case of long, awkwardly shaped, or easily distorted components. The accuracy and concentricity of any steady or support system is particularly important when machining pistons for internal combustion engines, since these have relatively lightweight body structures, usually in a light alloy material, to minimise inertia effects in the running engine. The skirt portion of such pistons is specially profiled with compound taper, barrel, and oval external form. It is necessary to effectively maintain profile accuracies of a few microns e.g. 2 to 5 microns, where a skirt is only 1 to 2.5 mm in radial wall thickness, and factors such as the deflections arising from the cutting forces, the elastic modulus of the piston skirt material, whirl effects and the possible influence of differential internal elasticity due to the presence of expansion control inserts or features, and even intermittant cutting, dictate that adequate support is very important. This is especially so where the open part of the piston skirt is towards the tailstock of the machine, the piston being gripped via its crown end.

The use of an internal skirt register diameter in such cases is known but its use hitherto presupposes an exact diametral fit between the register (usually on the tailstock ram) and the piston. This fit, even if ideal at the commencement of cutting, will be modified by expansion of the piston as machining proceeds with a consequent loss of accuracy.

According to the present invention a device for holding and supporting a piston having a crown and a skirt during machining comprises a headstock against which the crown of the piston is to be located and a tailstock comprising a skirt locating ring having a conical locating surface adapted to engage a conical register inside the piston skirt.

When in use the device of this invention may be used in finish machining to maintain the concentricity of the piston during skirt machining within ±0.003 mm. preferably the skirt locating ring is resiliently mounted upon a body portion of the tailstock so as to allow some movement of the ring relative to said body in a direction parallel to the axis of the ram.

Preferably the inclusive cone angle of the locating surface of the ring lies in the range 30 to 60 degrees. Very small inclusive angles of the order of 5 degrees may lead to jamming, whilst inclusive angles over 80 degrees provide inadequate guidance and stability.

The tailstock may also comprise a ram adapted to push against the crown of the piston from the interior of the piston and force said crown against the headstock, the longitudinal axis of this ram substantially corresponding to the axis of the conical locating surface.

Drive may be transmitted to the piston in use of the holding device by any conventional method, for instance tangs may be provided on the headstock to cut into and grip the crown of the piston as the latter is forced against the headstock.

On the pistons to be used with the holding device the conical register inside the piston skirt is preferably inset from the edge of the skirt to improve the effectiveness of location of the piston by the holding device by providing an initial centring action as the locating ring is moved into contact with the skirt of the piston.

Figure 2:
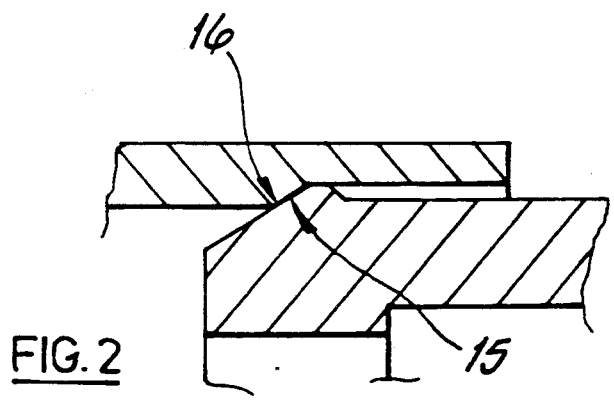

The invention will now be described in more detail with reference to the accompanying drawings in which FIG. 1 is a partially sectioned side view of the holding device of this invention and FIG. 2 is a detailed cross-sectional view showing the contact area inside the piston skirt in the holding device.

As shown in FIG. 1 the holding device consists of a headstock 1 against which a piston 2 (for an internal combustion engine) is to be located, and a tailstock body 3 carrying a locating ring 5 and a ram 17.

The tailstock body 3 is provided with an annular recess 12 and the piston locating ring 5 extends from said recess, being resiliently mounted by virtue of a pair of annular dished springs 8 which are located in the recess 12. The locating ring 5 is rotatable relative to the tailstock body 3 on which it is mounted by means of a pair of accurate bearings 6 and 7 between the ring and the body 3 and the ring and the springs 8 respectively. A dust cover 9 is provided to prevent extraneous matter accumulating in the recess and getting into the bearings.

Within the tailstock body 3 is slideably mounted a ram 17 which may be extended from the tailstock body and carries an engaging pad 10 to engage the interior surface 11 of the piston crown. The engaging pad 10 may rotate relative to the remainder of the tailstock by virtue of a bearing 13.

In operation of the device the piston 2 is placed against the headstock 1 by means of an accurate retractable placing means (not shown). The tailstock is then moved towards the headstock until the piston locating ring 5 enters the skirt of the piston in a parallel sided zone 14.

Movement of the tailstock body is continued until a conical surface 15 on the piston locating ring 5 contacts a matching surface 16 on the interior of the piston skirt as shown in detail in FIG. 2. The movement of the tailstock body is stopped when springs 8 have been compressed to a predetermined extent.

The retractable piston placing means is retracted and the ram 17 is extended from the tailstock body 3 and the engaging pad 10 is thus urged against the surface 11, forcing the piston crown onto tangs (not shown) extending from the headstock surface 18.

The headstock may then be rotated and the piston 2 rotates with it allowing the piston surface to be machined by means of any suitable cutting tool 4.

During machining of the piston 2 heat is generated which will cause the piston to expand. The locating ring 5 is, however, able to stay in intimate contact with the conical surface inside the skirt of the piston because the resilient mounting of the ring 5 keeps it firmly pressed in position despite expansion or whirling of the piston.

The open end of the piston skirt is subjected to cutting forces that would normally give rise to deflections, however the conical locating ring 5 limits these deflections to circa 0.005 mm or less during the finish machining.

Once the piston has been machined a retractable placing means is again used to grip the piston and all parts of the tailstock may then be fully withdrawn from the piston to allow it to be removed.

I claim:

1. A device for holding and supporting a piston having a crown and a skirt during machining comprises a headstock against which the crown of the piston is to be located and a tailstock comprising a skirt locating ring having a conical locating surface adapted to engage a conical register inside the piston skirt and a ram adapted to push against the crown of a piston from the interior of the piston and force the crown against the headstock, the longitudinal axis of the ram substantially corresponding to the axis of the conical locating surface.

2. A device according to claim 1 in which the skirt locating ring is carried on said tailstock on a bearing such as to be freely rotatable about the axis of the ring and relative to said tailstock.

3. A device according to claim 1 in which the inclusive cone angle of the locating surface of the ring lies in the range 30 to 60 degrees.

4. A device according to claim 4 wherein the skirt locating ring is carried on the tailstock on a bearing and the rotational axis of the skirt locating ring coincides with the longitudinal axis of the ram.

5. A device according to claim 1 in which said ram carries a pad to engage the interior surface of the piston crown, said pad being mounted on a bearing so as to be rotatable relative to the remainder of the tailstock about an axis which coincides with the longitudinal axis of the ram.

6. A device according to claim 1, in which the skirt locating ring is resiliently mounted upon a body portion of the tailstock so as to allow some movement of the ring relative to said body in a direction parallel to the axis of the ram.

7. A method of locating a hollow piston having a crown and skirt during machining which comprises providing inside the skirt of the piston a conical register, and holding said piston in a device which consists essentially of a headstock, against which the piston crown is held by a ram exerting pressure on the interior of the piston crown, the ram extending inside the piston from a tailstock, said tailstock also comprising a skirt locating ring having a conical locating surface which engages said conical register.

8. A method according to claim 7 in which the conical register is provided at a location inside the piston skirt which is inset from the edge of the skirt.

9. A method according to claim 7 in which the piston is to be rotated by the headstock wherein the skirt locating ring and a pad on the end of said ram are each freely rotatable relative to the remainder of the tailstock.

* * * * *